Patented Oct. 13, 1931

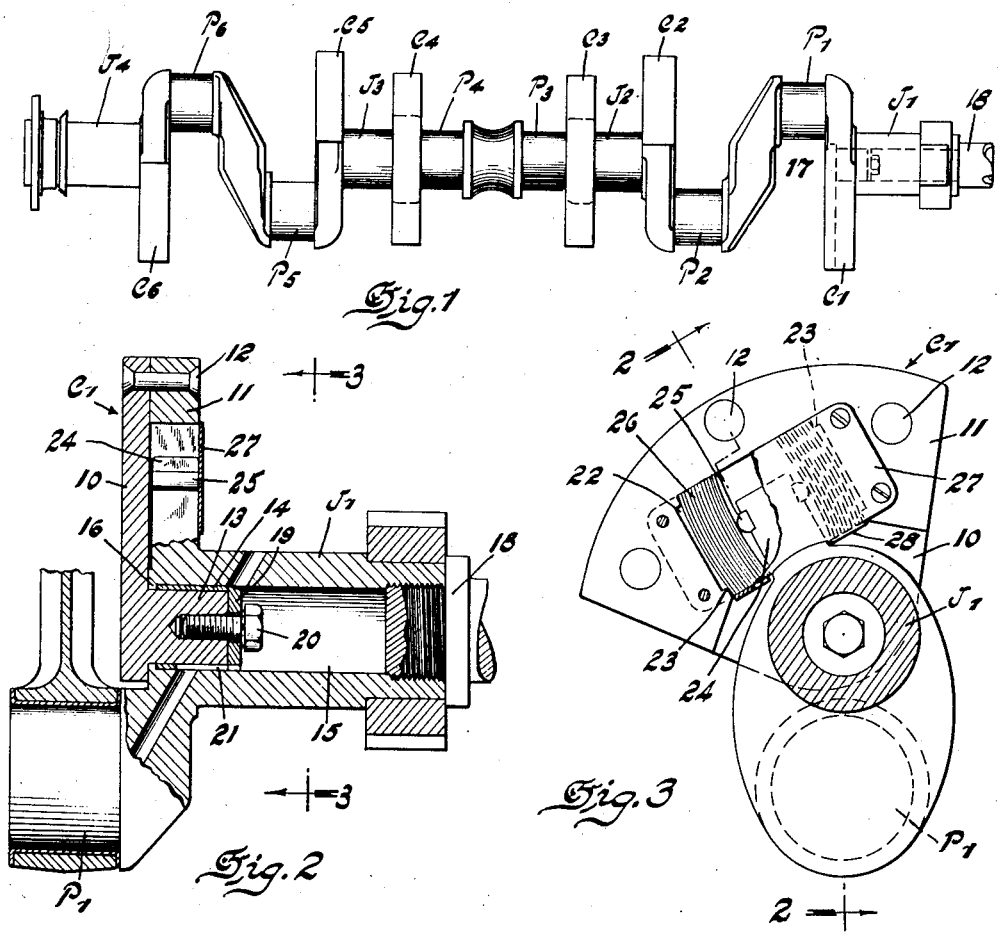

1,827,721

UNITED STATES PATENT OFFICE

CALEB E. SUMMERS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN

MEANS FOR COUNTERBALANCING AND FOR COUNTERACTING TORSIONAL VIBRATION IN CRANK SHAFTS

Application filed March 31, 1926. Serial No. 98,774.

In application Ser. No. 10,640, filed by me on the 20th day of February, 1925, there is disclosed and claimed a method and means for counteracting torsional vibrations in shafting by impressing upon the shafting vibrations of another body that are out of phase with respect to those of the shafting and, more particularly, by elastically attaching to an engine crank shaft a body having a natural period of vibration that is substantially the same in frequency as the natural period of the shaft, but which impresses its vibrations upon the shaft in approximately opposite phase.

In engines where high speed is required, it is desirable that counterweights be attached to the crankshaft, the counterweights being of such mass and disposition as to counteract the tendency of the cranks and other off center masses to bend the crank shaft between its bearings under the influence of centrifugal force. In crank shafts where counterweights are used, the application of a device of the kind described in my application referred to may be somewhat simplified by mounting one of the counterweights in such manner that it may serve as a vibratory mass to neutralize the torsional vibration of the shaft as well as a counterweight to balance dynamically a substantially opposite crank.

It is an object of this invention to obtain from one off-center mass the effect of a counterweight, adapted to neutralize the centrifugal force of an opposite crank, and also of a torsional vibration neutralizer.

In the accompanying drawings, in which like reference characters indicate like parts throughout the several views:

Fig. 1 is an elevation of a counterweighted six throw crankshaft in which one of the counterweights is adapted to function as a vibration neutralizer;

Fig. 2 is a longitudinal section through one end of a crank shaft having attached thereto a combined counterweight and vibration neutralizer, the section having been taken on the line 2—2 of Fig. 3;

Fig. 3 is a section on the line 3—3 of Fig 2.

The crank shaft exemplified in Fig. 1 has four journals, J1, J2, J3 and J4. It has six crank pins arranged in two series. The crank pins of the first series are indicated by the characters P1, P2, P3, and those of the second by the characters P4, P5, P6. The crank pins of each series are spaced 120 degrees apart as is usual in six cylinder engines, where the cylinders are arranged in line, the axes of pins P3 and P4 lying in the same straight line, while the axes of P2 and P5 lie in another straight line and the axes of P1 and P6 in another straight line, the said lines being angularly spaced about the axis of the crank shaft 120 degrees apart. The centrifugal forces exerted by the cranks, crank pins and a portion of the connecting rods to be attached are counterbalanced by counterweights C1, C2, C3, C4, C5 and C6 disposed, respectively, in different transverse planes along the shaft. The crank shaft depicted in Fig. 1, with its counterweights, should be in both static and dynamic balance. As the cranks and pins are symmetrically disposed about the axis the shaft is in static balance without any counterweights.

The counterweight C1, in the embodiment shown, is so constructed and mounted as to function as a vibration neutralizer. It may move to a limited extent with respect to the crank shaft in a plane transverse of the shaft in a direction approximately at right angles to a radius extending from the axis of the shaft through the center of mass of the counterweight. Although it may be placed anywhere along the crankshaft, its most effective position is toward that end where the amplitude of the vibrations is apt to be greatest. In automobile crankshafts, this is the front end, or that end which is most distant from the fly wheel, which is ordinarily secured to the rear end of the shaft. The counterweight C1 in the embodiment shown is in the form of a sector, which, for convenience of manufacture, consists of the part 10 and the part 11 firmly united together as by the rivets 12. Part 10 is provided near its apex with a stud 13 which may be integrally formed thereon and fits neatly within a bearing bushing 14. The bushing 14 is located within a bore 15 in the front journal J1 of the crank shaft. A shoulder 16 may be formed at that end of the bore which opens into the space 17 between the adjacent crank arms that carry the forward crank pin P1. Bushing 14 may be fitted against the shoulder 16. Bore 15 extends completely through the journal J1, the forward end being plugged in the embodiment shown by a threaded member 18 which may be formed to engage with a hand crank by which the engine may be turned over. The counterweight C1 may be held from axial movement by means of a stop plate 19, which is of a diameter substantially that of the bore 15 and bears against the front end of bushing 14. The stop plate is held to the stud 13 by a headed screw bolt 20. It will be apparent that the bushing 14, stop plate 19 and screw 20 may be assembled through the front end of the bore 15, after the vibration neutralizer and counterweight C1 has been positioned. Both bushing 14 and plate 19 may be grooved in one side, as indicated at 21, for the purpose of assisting the distribution of oil received through a perforation in the journal from the bearing. Section 11, which is riveted to the part 10 of the combined counterweight and vibration neutralizer C1, is somewhat segment-like in contour as shown in Fig. 3. It is formed with a recess 22, which is in general an oblong rectangle, and has shoulders 23 at opposite ends to serve as spring seats as will be presently explained. The long side of the oblong rectangular recess 22 that is furthest from the center of the crankshaft forms an unbroken wall. The side opposite opens toward the axis of the crank shaft.

Projecting radially from the crank shaft into the rectangular recess 22 is a lug 24 which is provided with bearing members 25 opposed to the shoulders 23. Between said bearing members and shoulders springs are interposed for the purpose of elastically mounting the member C1. The bearings 25 are preferably saddle like members seated in recesses on opposite sides of lug 24. A plurality of flat springs 26 are arranged on each side of the lug 24, a bearing 25 engaging the mid line of each spring assembly; opposed thereto, shoulders 23 engage the outer ends of each spring assembly.

The springs 26 and the bearing saddles 25 may be held from displacement by a cover plate 27 which has, at the edge nearest the crankshaft axis two turned-in flanges 28. Cover plate 27 prevents displacement of the springs and bearing saddles in a direction parallel with the crank shaft axis. The flanges 28 on plate 27 engage the ends of the springs which are nearest to the axis of the crank shaft and prevent displacement of the springs transversely of the crankshaft axis.

Stud 13 should have an easy bearing in the bushing 14 so that friction will have relatively slight effect in the operation of the vibration neutralizer. The stiffness and number of springs 26 should be accurately gaged with respect to the weight of the vibration neutralizer which is determined by the mass and proportions of the crank shaft so that the frequency of the vibration neutralizer at periods of resonance will be substantially the same as the natural frequency of vibration of the shaft. The proper proportion and relationship of parts may be calculated mathematically or determined empirically.

In operation the combined counterweight and vibration neutralizer will function always as a counterweight. When a period of resonance is reached it will be set into vibration by the resonant vibrations of the crank shaft. As the natural frequency of vibration of the counterweight is substantially that of the crank shaft, it will, on account of lag, if properly designed, vibrate out of phase with the vibrations of the crank shaft and at the same frequency, and will, therefore, neutralize the vibrations of the shaft.

The same principle may be applied to crankshafts having a different number of counterweights or a different number of journals or a different number of crank pins than the exemplified embodiment.

Although I have described and illustrated a particular preferred embodiment of the invention in order to comply with the statute, it will be understood that it is not intended that the invention shall be limited to the particular embodiment described and illustrated, but only by the appended claims.

What I claim is:

1. A crank shaft having a counterweight resiliently mounted thereon in position to counterbalance the centrifugal effect of an opposed crank and its attached parts and adapted also to counteract the torsional vibrations of said shaft, said counterweight being pivoted on an axis coinciding with the axis of the shaft, and springs interposed between the counterweight and the shaft exerting elastic forces in opposite directions upon the counterweight, said springs having a degree of resiliency with respect to the mass of the counterweight and shaft such that the vibrations of the counterweight induced by vibrations of the shaft will be out of phase with the vibrations of said shaft.

2. Means such as defined in claim 1 in which the crank shaft is provided with a lug and the counterweight with a recess embracing said lug, the springs being disposed between the lug and the counterweight in said recess.

3. The combination of a crank shaft having an axial bore opening into a crank space, a vibratory mass having a stud pivoted in said bore and oppositely acting springs interposed between the mass and the crank shaft.

4. The combination in a crank shaft of a crank arm, a counterweight pivoted to one end of said arm and extending in the plane of and beyond said end of the arm, and resilient means to oppose oscillation of the counterweight relative to said arm.

5. In a crank shaft, an arm extending in a plane transversely of the crank shaft axis, a counterewight pivoted to the end of said arm and extending beyond the end thereof, and spring means opposing movement between the counterweight and the arm.

6. The combination in a crank shaft of a crank arm having a lug, a counterweight pivoted to the arm, said counterweight having a recess into which said lug projects, and resilient means in the recess intermediate opposite sides of the lug and the counterweight.

7. In a crank shaft, an arm having a member extending from an end thereof, a counterweight pivotally connected to the shaft and having a recess into which the arm member extends and in which it can oscillate, and resilient means between the member and the counterweight opposing relative oscillation therebetween.

8. In a crank shaft, an arm having a lug extending from the end of the arm remote from the crank pin, a pivoted counterweight extending beyond the lug of the arm, said counterweight having a recess into which said lug extends and can oscillate, and resilient means seated in said recess opposing oscillation of the counterweight relative to the abutment.

9. In a crank shaft, a crank arm having an integral member extending from the end of the arm remote from the crank pin, a pivoted counterweight carried by the shaft having a recess defining opposed spring seats and adapted to receive said arm member, and opposed springs in said recess between said spring seats and the arm member.

10. In a crank shaft having a crank arm provided with an extension, a counterweight pivoted to the end of said arm adjacent the extension, and spring means between the counterweight and the extension opposing movement of the counterweight relative to the arm.

11. In a crank shaft having a crank arm provided with an extension, a counterweight pivoted to the end of said arm, and spring means connecting the counterweight to the extension to oppose movement of the counterweight relative to the arm.

In testimony whereof I affix my signature.

CALEB E. SUMMERS.